March 29, 1955  D. H. PATTEN  2,705,069

ARTICLE HANDLING APPARATUS

Filed May 16, 1951  4 Sheets-Sheet 1

INVENTOR
Dan H. Patten
BY Edwin A. Block
ATTORNEY

March 29, 1955
D. H. PATTEN
2,705,069
ARTICLE HANDLING APPARATUS
Filed May 16, 1951
4 Sheets-Sheet 2
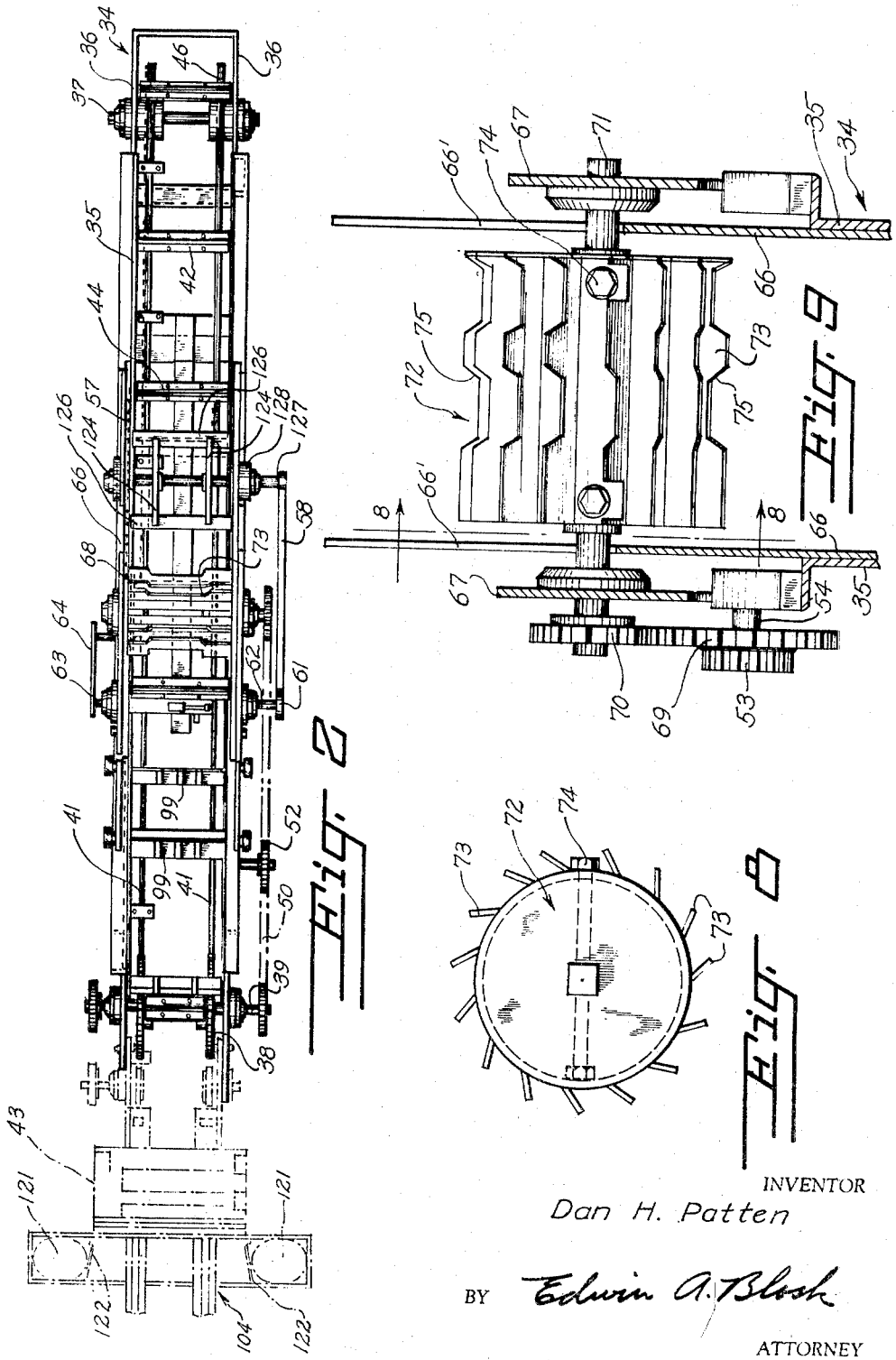
INVENTOR
Dan H. Patten
BY Edwin A. Blosh
ATTORNEY

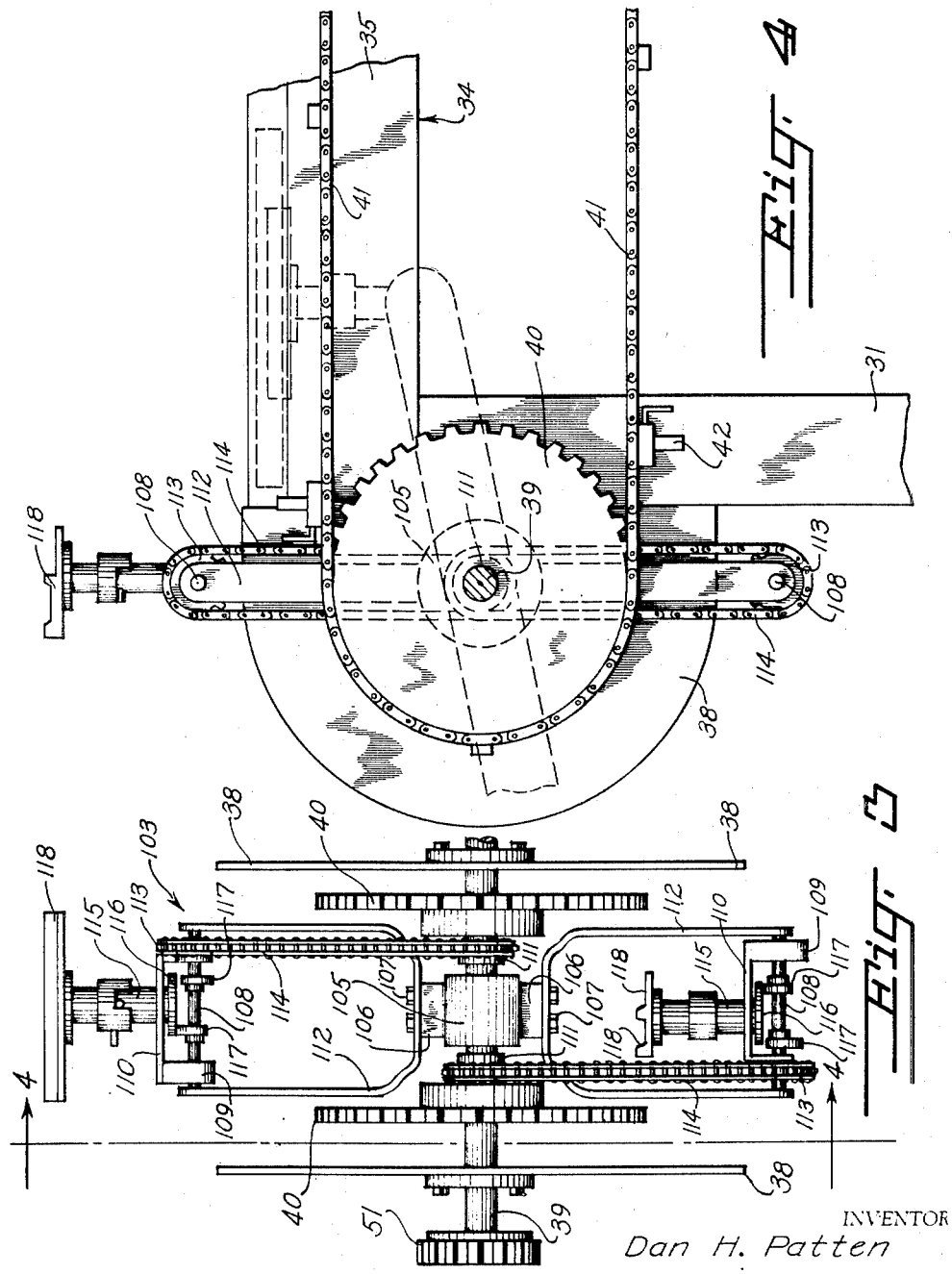

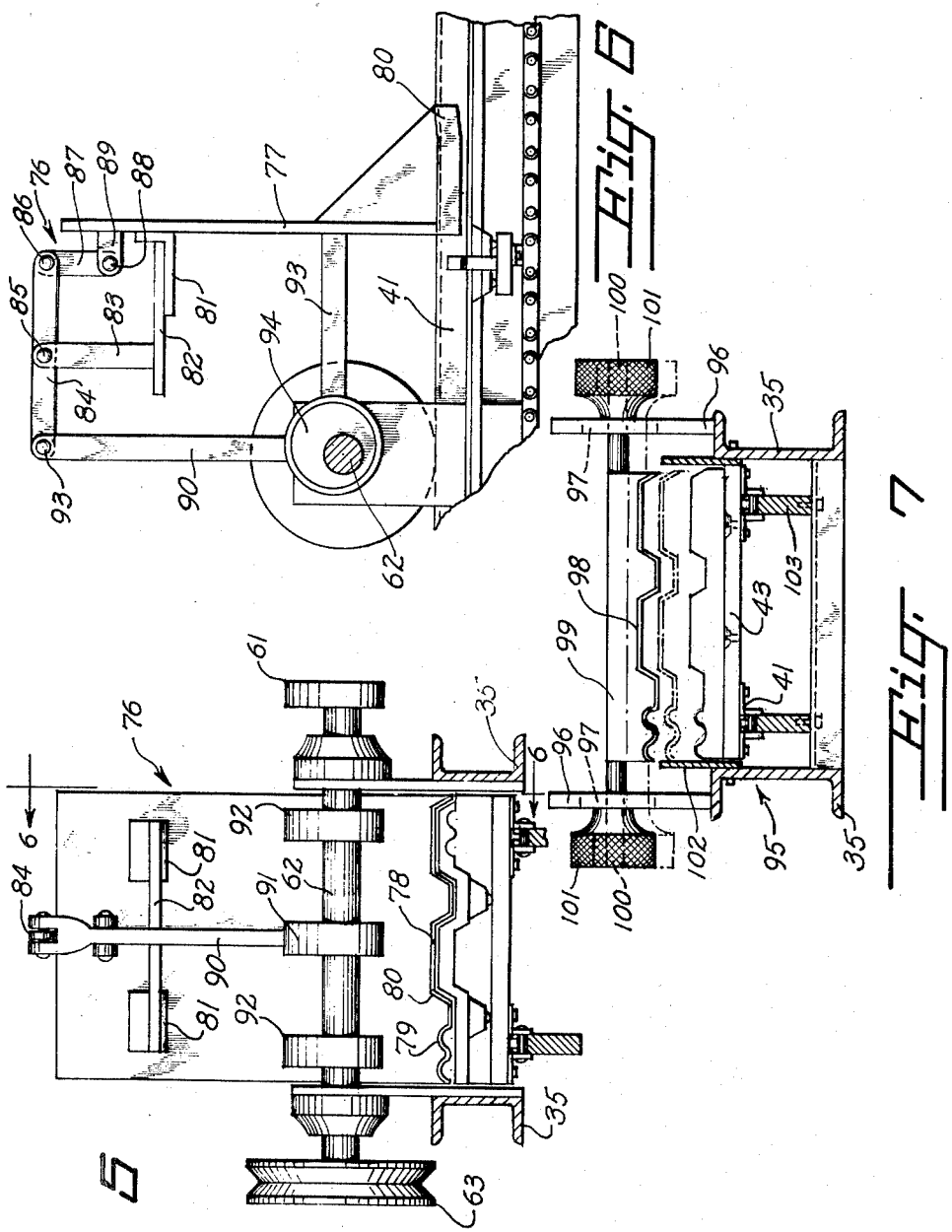

United States Patent Office 2,705,069
Patented Mar. 29, 1955

2,705,069

ARTICLE HANDLING APPARATUS

Dan H. Patten, San Bernardino, Calif.

Application May 16, 1951, Serial No. 226,647

3 Claims. (Cl. 198—33)

This invention relates to a method of and apparatus for forming roof shingles.

The object of the invention is to provide a method of and apparatus for fabricating roof shingles from concrete or other materials, the material being deposited from a hopper onto a series of continuously moving pallets, the shingles being turned out rapidly and of uniformly high quality.

Another object of the invention is to provide a method of and apparatus for fabricating roof shingles, wherein the constituent material will be automatically deposited onto mold boards or pallets as the pallets pass beneath a hopper, whereby the loaded pallets can be readily treated in subsequent shaping operations on the machine of the present invention.

Still another object of the invention is to provide a method of and apparatus for making roof shingles and the like, wherein a novel means is provided for automatically and efficiently finishing the upper surface of the shingles during the movement of the pallets, the loaded pallets being automatically lifted off of the machine and deposited on a moving conveyor.

A still further object of the invention is to provide a method of and an apparatus for making roof shingles, wherein the machine of the present invention includes an endless conveyor for carrying a plurality of pallets therealong, the pallets adapted to receive concrete, or other shingle-forming material from a hopper in predetermined quantities, the machine of the present invention adapted to be readily disassembled or moved to a position so that the various parts can be readily cleaned, the loaded pallets being removed from the conveyor after the pallets pass through the shaper members.

A still further object of the invention is to provide a shingle-forming machine which includes a conveyor for carrying along a plurality of pallets that are adapted to receive a predetermined quantity of shingle-forming material from a hopper after which the material is tamped on the pallets, the pallets then passing through shaper elements which help form the shingles to the desired shape, after which the pallet is lifted from the conveyor onto a table or moving conveyor, the machine of the present invention being simple and inexpensive to manufacture.

Other objects and advantages will be apparent during the course of the following description.

In the accompanying drawings forming a part of this application, and in which like numerals are used to designate like parts throughout the same:

Figure 2 is a top plan view of the machine, with the hopper removed, a portion of the receiving conveyor being shown in broken lines;

Figure 3 is a sectional view taken on the line 3—3 of Figure 1;

Figure 4 is a sectional view taken on the line 4—4 of Figure 3;

Figure 5 is a sectional view taken on the line 5—5 of Figure 1;

Figure 6 is a sectional view taken on the line 6—6 of Figure 5;

Figure 7 is a sectional view taken on the line 7—7 of Figure 1;

Figure 8 is a sectional view taken on the line 8—8 of Figure 9;

Figure 9 is a sectional view taken on the line 9—9 of Figure 1.

Figure 1:
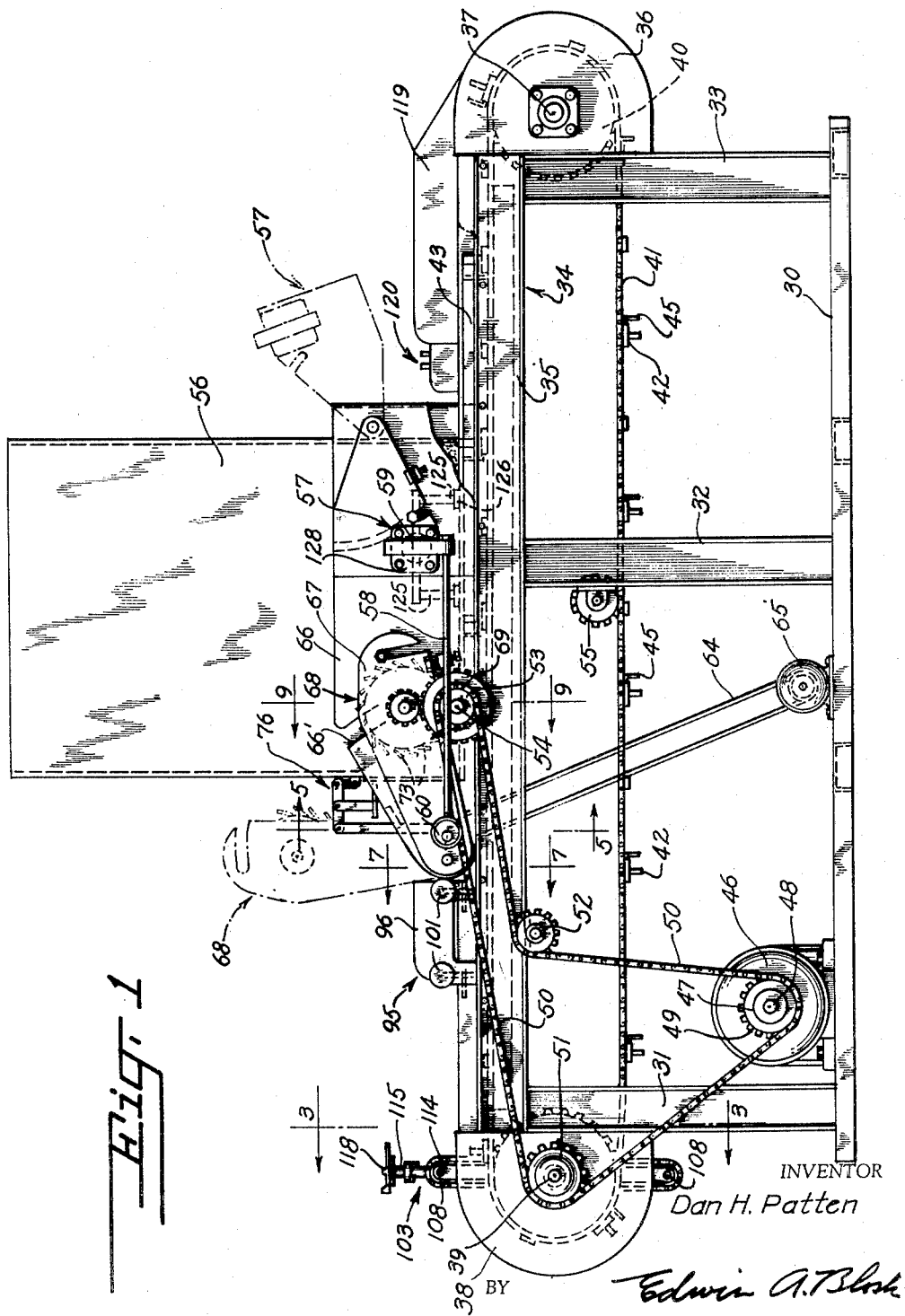
Figure 1 is a side elevational view of the machine of the present invention, the machine adapted to be used in forming roof shingles.

Referring in detail to the drawings, the numeral 30 designates a horizontally disposed base which may be fabricated of any suitable material, such as metal, and extending upwardly from the base 30 and secured thereto are a plurality of vertically disposed legs 31, 32 and 33. There are two of the legs 31, two of the legs 32 and two of the legs 33. However, the number of these legs may be varied if desired. Extending across the upper ends of the vertically disposed legs and secured thereto is a horizontally disposed frame 34, Figure 1, and the frame 34 comprises a pair of spaced parallel beams 35.

Secured to the legs 33 is a pair of spaced parallel vertically disposed plates 36, and extending between the pair of plates 36 and rotatably supported thereby is a driven shaft 37. A similar pair of plates 38 are secured to the legs 31, and a drive shaft 39 extends rotatably between the pair of plates 38. A pair of vertically disposed sprockets 40 are mounted on each of the shafts 37 and 39, and a pair of endless chains 41 are trained over the sprockets on the shafts 37 and 39. The chains 41 constitute a conveyor for moving pallets 43 therealong, such pallets adapted to be placed on the conveyor by a suitable operator or person standing adjacent the plates 36.

Extending between the pair of chains 41 and secured thereto are a plurality of spaced parallel separators 42 which are adapted to support pallets 43 thereon. Pins 44 project from the separator 42, Figure 2, and these pins are adapted to project through the forms or pallets 43 in order to produce the nail holes in the finished tile or shingle. Dividers 45 also extend between the pair of chains 41, and are secured thereto, the dividers 45 serving to maintain the pallets in their proper spaced positions.

For operating the conveyor, a motor 46, which may be connected to a suitable source of electrical energy, is supported on the base 30. The motor 46 has associated therewith a safety clutch 47, and the motor 46 serves to drive a shaft 48. The motor driven shaft 48 has a sprocket wheel 49 mounted thereon, while mounted on the drive shaft 39 is a sprocket wheel 51. A drive chain 50 is trained over the sprocket wheels 49 and 51, and the chain 50 also engages an idler sprocket 52 which is supported by one of the beams 35. Extending between the beams 35 and supported thereabove is a horizontally disposed shaft 54, Figure 1, there being a sprocket wheel 53 mounted on an end of the shaft 54, Figure 9. The shaft 54 provides a means for operating a rotary shaping mechanism, as later described in this application, and the chain 50 is also trained over the sprocket 53. The conveyor chains 41 also engage sprockets 55 which are supported by the legs 32. By adjusting the sprockets 55, the tension on the chains 41 can be adjusted as desired.

Supported on the frame 34 is a hopper or container 56, Figure 1, and the hopper 56 is adapted to hold a quantity of concrete, or other material to be used in making the roof shingles or tiles. A tamper mechanism 57 is adapted to be used for tamping the material onto the pallets 43 and a mechanism is provided for actuating the tamper 57. As shown at Figure 1, the tamper 57 includes a pivoted support frame adapted to be swung from the solid line position to the dotted line position when the parts are to be cleaned. The actuating means for the tamper 57 includes a movable arm 58 that has one end connected to a bracket 59, there being an eccentric strap formed on the other end of the arm 58 fitting eccentric 60 mounted on one end of a horizontally disposed shaft 62. A pulley 63 is fixed on the other end of shaft 62 and a V-belt 64 extends from the pulley 63 to a small motor 65. The motor 65 may be electrically actuated and is supported on the base 30. Thus, upon operation of motor 65, the belt 64 will cause rotation of the shaft 62, whereby the cam 60 will rotate to thereby reciprocate arm 58 and oscillate the tamper 57, so that the material will be packed onto the pallet 43 with the required amount of pressure.

Extending upwardly from each of the beams 35 and secured thereto is a vertically disposed wall panel 66, each of which is provided with an inclined slot 66', Figure 1 and 9. A force shaping mechanism 68 is provided, and includes a pair of elongated side plates 67 which are pivotally mounted on the shaft 62. Thus, the rotary shaper mechanism 68 can be swung from the position shown in solid lines in Figure 1 to the broken line position therein when these parts are to be cleaned. Mounted on the short shaft 54, Figure 9, is a large gear 69 which meshes with a smaller gear 70, and the latter is secured to a horizontally disposed shaft 71 which extends through the pair of aligned slots 66', Figure 9. A drum 72 is fixed on shaft 71 by suitable bolt and nut assemblies 74, the drum 72 being interposed between the pair of panels 66. Secured to the exterior of the drum 72 in any suitable manner, as for example, by welding, are a plurality of spaced tangential blades 73 provided with recesses 75, so that as drum 72 rotates the moldable material on the pallets 43 will be shaped to the desired configuration or contour.

Arranged on the frame 34 is a shaper packer mechanism 76 shown in detail in Figures 5 and 6, embodying a plate 77 that has its bottom edge parts 78 and 79 shaped in conformity with the desired top contour of the material on the pallet moving therebeneath. Secured to and extending from the lower edge of plate 77 and shaped in conformity with the contour indentations 78 and 79 is a channel shaped forwardly projecting presser shoe 80.

Means are provided for causing plate 77 to oscillate through vertical and horizontal movement so as to insure that the material on the pallet is properly shaped. This means comprises a pair of angular brackets 81 that are secured, as by welding, to the wall 77 and engage a horizontal plate 82. A link 83 has its lower end secured to the plate 82 and its upper end pivotally connected, by means of a pin 85, to a lever 84. A pin 86 pivotally connects one end of the lever 84 to a link 87 and the latter is pivotally connected, by means of a pin 88, to an ear 89, secured to the plate 77. An arm 90 is pivotally connected to the lever 84 by means of a pin 93, Figure 6, while the lower end of arm 90 is connected, through strap 91, with an eccentric 94 on shaft 62. A pair of horizontally disposed, spaced, parallel arms 93 each have one end secured to plate 77, while the other end is connected, through eccentric straps 92, with eccentrics 94, that are also mounted on the shaft 62. Thus, as the shaft 62 rotates, the eccentrics will cause the arms 90 and 93 to reciprocate vertically and horizontally to oscillate shoe 80 and accurately shape the material on the pallet.

After the loaded pallets leave shaper 76, they are subjected to final shaping by mechanism which is indicated generally by the numeral 95. This mechanism is shown in detail in Figure 7 and comprises a pair of spaced, parallel, vertically disposed side plates 96 which are fixed on the upper faces of beams 35. Spaced parallel side panels 102 are interposed between the plates 96 and each of the plates 96 is provided with a slot 97. A body member 99 having a trowel 98 formed integrally therewith is arranged between each end part of the plates 96, as shown at Figures 2 and 7. The finishing trowel 98 has the same configuration as the finished roof shingle is to have. Projecting from each end of the body member 99 is a trunnion 100 threaded exteriorly to receive therein the interiorly threaded shank of a knurled knob 101. By loosening the knobs 101, the body member 99 can be shifted vertically so that the position of the trowel 98 can be adjusted as desired. After the trowel 98 has been moved to its desired position the knob 101 can be again tightened, whereby the parts will be maintained fixed in their adjusted positions. The trowels 98 serve to provide the roof shingles with a smooth finish. As shown at Figure 7, rails 103 are provided to maintain the upper runs of the chains 41 in substantially horizontal arrangement.

A mechanism is provided for picking up the loaded pallets from the end of the conveyor, whereby the loaded pallets can be loaded onto an additional conveyor or table, so that the pallets can be carried automatically to a drying room or other locality. The conveyor for carrying the loaded pallets to the drying room is shown in broken lines in Figure 2, and is indicated generally by the numeral 104. The pick-up mechanism is shown in detail in Figures 3 and 4 and comprises a collar 105 which is secured to the drive shaft 39. A pair of spacer blocks 106 are mounted on opposed sides of the collar 105 and each is secured to the inner transverse web of a U-shaped bracket 112, the brackets 112 being secured to the spacer members by bolt-and-nut assemblies 107. Mounted on and fixed to the outer ends of the side arms of each of the brackets 112 is a transverse stub shaft 108, projecting through a bearing 109. A shelf plate 110 is secured to the bearing 109. Mounted on the drive shaft 39 but fixed against rotation is a pair of spaced apart sprockets 111, while mounted on each of the stub shafts 108 is a sprocket 113, the latter sprocket being fixed to shelf plate 110 to cause it with its bearing 109 to rotate about fixed shaft 108 in response to rotation of brackets 112. Chains 114 are trained over the respective pairs of sprockets 113 and 111, whereby rotation of the drive shaft 39 causes rotation of the plates 110 and their bearings 109 about the axes of stub shafts 108. A post 115 rotatably projects through each of the shelves 110 and has a shoulder 116 on the inner end. A pair of cams 117 are fixed on each of the stub shafts 108 so that as the plates 110 on the shafts 108 rotate, the cams 117 will alternately engage the shouldered end of each post 116 to oscillate the post. A platform 118 is separately secured to the outer end of each post 115 and is adapted to move under and engage the loaded pallets to lift the same and deposit it upon the conveyor 104. Due to the construction of the cams 117 and shoulder 116, the pallets with the material thereon will be given a partial turn so that they will be properly deposited on the conveyor 104, as shown in Figure 2. The parts of the pick-up mechanism 103 are so constructed that the pair of platforms 118 will engage alternate pallets whereby each pallet will be removed from the conveyor and deposited on the member 104. The posts 115 are thus maintained in vertical positions as they are revolved about the axis of shaft 39 to move under, engage, lift and partially turn the pallets as they are transferred from the conveyor chains onto a receiving conveyor.

The machine of the present invention is especially useful for manufacturing roof shingles from light weight Perlite containing concrete or other materials. These materials can be first mixed in a paddle mixer and then the material can be conveyed into the hopper 56, and the material working down through the hopper will provide the machine with a continuous feed. The empty pallets or metal forms 43 are fed onto the machine by an operator and placed between the guide plates 119. A control switch 120 is provided and serves to stop the machine when the metal forms are displaced. The metal forms may initially pass beneath a sprayer, whereby the pallets will be coated with oil, so that the materials will not adhere to the pallets, whereby the shingles can be easily removed from the pallet after the mix has set. The pallets 43 travel continuously below the hopper 56 to form a floor thereat and the material is tamped by the mechanism 57. The loaded pallets, after initial shaping by the baldes 73, are pressed and further shaped by the shaper mechanism 76. After the loaded pallet has been acted upon by the shaper mechanisms first and second, it is acted upon by the finishing trowels 98 which serve to provide a sharp accurate shaping of the tile.

Next, the troweled pallets are moved along by the chains 41, and are raised and removed by the pick-up mechanism 103, as shown in Figures 3 and 4. The pallets which are deposited on the conveyor 104 by means of the pick-up mechanism 103 may be trimmed by blades 122 driven by motors 121. The blades serve to trim the sides of the tiles so that the rough edges will be removed from the tile or shingle. The completed tiles or shingles, after passing through the trimmer blades 122, may be conveyed to a suitable cart for transfer to drying racks.

The tamper 57, as shown at Figures 1 and 2, includes a pair of speed parallel arms 124, each having depending therefrom a pair of vertically disposed rods 125. A pair of transversely disposed tamping strips 126 are secured to the lower ends of the rods 125, the arms 124 being secured to a horizontally disposed shaft 127. The shaft 127 projects through bearings 128 and the arm 58 has one end secured to a cranked end thereof. Thus, as the arm 58 is caused to reciprocate, shaft 127 will rock and tamp the material on the pallets.

The construction of the present invention enables the various parts, such as the tamper or force feeding mechanism to be raised from the machine so that such parts can be readily cleaned.

From the foregoing description and study of the drawings, it will be apparent that I have provided a new construction. It is, of course, to be understood that I reserve the right to make such changes in the form, constructron, and arrangement of parts as will not depart from the spirit of the invention or the scope of the appended claims.

What is claimed is:

1. In a shingle forming machine including a frame, a conveyor trained over said frame, a mechanism for picking up pallets from said conveyor, said mechanism comprising a horizontally disposed drive shaft, a collar secured on said drive shaft, a pair of U-shaped brackets connected to said collar, a stub shaft carried by each of said brackets, a support mounted rotatively on each stub shaft, chain and sprocket means connected to said supports to hold said supports oriented in a fixed position while they are rotated with said brackets, a post rotatably carried by eac hof said supports, and a pallet engaging platform connected to each of said posts.

2. The machine of claim 1 and: means connected with each stub shaft and each post to oscillate the latter.

3. The machine of claim 2, wherein said post oscillating means comprises a shoulder on each post, and a pair of spaced cams on each stub shaft alternately engageable with the shoulder on the post with which said cams are operatively associated.

References Cited in the file of this patent

UNITED STATES PATENTS

| | | |
|---|---|---|
| 1,559,498 | Brandell | Oct. 27, 1925 |
| 1,783,939 | Schroder | Dec. 2, 1930 |
| 1,786,608 | Halstead | Dec. 30, 1930 |
| 1,835,570 | Lorenz | Dec. 8, 1931 |
| 1,858,619 | Delamere | May 17, 1932 |
| 1,920,716 | Schafer | Aug. 1, 1933 |
| 1,959,799 | Potthoff | May 22, 1934 |
| 2,545,366 | Mandryl | Mar. 13, 1951 |

OTHER REFERENCES

Ser. No. 368,952, Cramer (A. P. C.), published May 18, 1943.